（12) United States Patent
Kashiwazaki

(10) Patent No.: US 6,249,214 B1
(45) Date of Patent: Jun. 19, 2001

(54) IMAGE PROCESSING APPARATUS, IMAGE PROCESSING METHOD, NAVIGATION APPARATUS, PROGRAM STORAGE DEVICE AND COMPUTER DATA SIGNAL EMBODIED IN CARRIER WAVE

(75) Inventor: Takashi Kashiwazaki, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/625,489

(22) Filed: Jul. 25, 2000

(30) Foreign Application Priority Data

Jul. 26, 1999 (JP) .................................................. 11-211272

(51) Int. Cl.⁷ ........................................................ B60Q 1/00

(52) U.S. Cl. ........................ 340/425.5; 340/435; 340/436; 340/437; 340/438

(58) Field of Search ................................ 340/425.5, 435, 340/436, 437, 438; 382/103, 104, 106, 107; 348/135, 142, 137, 138, 140, 148

(56) References Cited

U.S. PATENT DOCUMENTS

| 5,555,312 | * | 9/1996 | Shima et al. | 282/104 |
| 5,835,028 | * | 11/1998 | Bender et al. | 340/937 |
| 5,987,152 | * | 11/1999 | Weisser | 382/104 |
| 6,091,833 | * | 7/2000 | Yasui et al. | 382/104 |

* cited by examiner

Primary Examiner—Jeffrey Hofsass
Assistant Examiner—Son Tang
(74) Attorney, Agent, or Firm—Sughrue, Mion, Zinn, Macpeak & Seas, PLLC

(57) ABSTRACT

An image processing apparatus is provided with: an image taking device (19a, 19b) for taking an image on a side of a movable body and outputting an image signal corresponding to the taken image; a movement vector detecting device (18, 24) for detecting a movement vector for each area of the image taken by the image taking device, on the basis of the image signal while the movable body is moving; and a distance calculating device (18, 25) for judging a spatial changing rate of a magnitude of the detected movement vector and calculating the distance to a road edge on the basis of the spatial changing rate.

20 Claims, 11 Drawing Sheets

IMAGE PROCESSING APPARATUS, IMAGE PROCESSING METHOD, NAVIGATION APPARATUS, PROGRAM STORAGE DEVICE AND COMPUTER DATA SIGNAL EMBODIED IN CARRIER WAVE

BACKGROUND OF THE INVENTION

1. Field of the Invention

The present invention generally relates to an image processing apparatus, an image processing method and a navigation apparatus, which can obtain a distance to a road edge and a road width on the basis of an image signal from an image-taking device (e.g., a motion picture camera) in a vehicle, which is presently traveling. The present invention also relates to a program storage device for storing a program and a computer data signal embodied in a carrier wave, which enable a computer to function as such an image processing apparatus.

2. Description of the Related Art

There is a navigation apparatus, which detects a present position of a vehicle as a movable body, and displays the detected present position together with a road map around it, to thereby conduct a route guidance. In this type of the navigation apparatus, a large storage capacity record medium (e.g., a CD-ROM, a DVD-ROM or the like), on which map data are recorded, is equipped, and is used to generate the display data displayed on a display picture plane. The map data on the record medium include data related to the shape of the road and various data for display as well as road width information accompanying those. Therefore, it is possible to read out the road width information corresponding to the road on which the vehicle is presently traveling, and the road width of this road can be grasped.

However, according to the above mentioned navigation apparatus, the road width information included in the map data does not indicate an accurate road width, but indicates an inaccurate and rough road width of the road, such as 5.5 m to 8 m for example. Thus, it is not possible to obtain an accurate road width information finely corresponding to each point of the road. Further, it is desired that the distance to the edge of the road is obtained in a real time manner and is used for the safe driving of the vehicle.

SUMMARY OF THE INVENTION

It is therefore an object of the present invention to provide an image processing apparatus and an image processing method, which can obtain a distance to the road edge or a road width by detecting a wall, a groove or a structure other than a road surface adjacent to the road surface out of an image which is taken from a presently traveling vehicle, and also a navigation apparatus, which can perform a warning or a guidance so as to secure a safe driving operation for a driver, in correspondence with a result of the image processing of the image processing apparatus, as well as a program storage device for storing a program and a computer data signal embodied in a carrier wave which enable a computer to function as such an image processing apparatus.

The above object of the present invention can be achieved by an image processing apparatus provided with: an image taking device for taking an image on a side of a movable body and outputting an image signal corresponding to the taken image; a movement vector detecting device for detecting a movement vector for each area of the image taken by the image taking device, on the basis of the image signal while the movable body is moving; and a distance calculating device for judging a spatial changing rate of a magnitude of the detected movement vector and calculating the distance to a road edge on the basis of the spatial changing rate.

According to the image processing apparatus of the present invention, the image taking operation on the side of the movable body such as a vehicle is performed and the image signal is outputted by the image taking device while the movable body is presently moving. The image signal at one time point and the image signal at another time point are compared with each other, so that the movement vector for each area is detected. At the horizontal portion such as a road surface etc., in the image, the changing rate of the movement vector becomes approximately constant. On the other hand, at the road edge, a discontinuous point of the changing rate is generated. Thus, it is possible to judge the road edge separately for each area, and to thereby calculate the distance to the road edge on the basis of the magnitude of the movement vector. Therefore, the calculated distance can be utilized for securing a safety in driving, aiding the navigation operation and the like, so as to improve the safety and the convenience of the movable body.

In one aspect of the image processing apparatus of the present invention, the image taking device has a first image taking device for taking the image on a left side of the movable body and a second image taking device for taking the image on a right side of the movable body, and the distance calculating device calculates a first distance to the road edge on the left side and a second distance to the road edge on the right side.

According to this aspect, in the movable body such as a vehicle, the image on the left side is taken by the first image taking device and the image on the right side is taken by the second image taking device, to respectively output the image signals. The processes after that are performed for the image on the left side and for the image on the right side respectively in the above mentioned manner by the movement vector detecting device and the distance calculating device, so that the distance to the road edge on the left side and the distance to the road edge on the right side are calculated. Therefore, it is possible to recognize the position of the movable body on the road by using these two distances and to thereby improve the safety and the convenience of the movable body.

In this aspect, the image processing apparatus may be further provided with a road width calculating device for calculating a road width of the road, on which the movable body is moving, on the basis of the first distance and the second distance calculated by the distance calculating device.

According to this aspect, the road width of the road on which the movable body is presently moving can be calculated on the basis of the two distances corresponding to the left and right images of the movable body such as a vehicle. For example, in case that the image taking devices are installed on both side of the vehicle, the road width can be obtained by adding these two distances and the distance between these image taking devices. Therefore, it is possible to secure the safety in driving by using this road width, and store the road width data in correlation with map data, so that the function and safety of the navigation for the movable body can be improved.

In another aspect of the image processing apparatus of the present invention, the image signal comprises frame image data, which has a predetermined frame cycle, as a unit, and the movement vector detecting device detects the movement vector on the basis of two consecutive frame image data.

According to this aspect, the object of the image process is the frame image data outputted for each frame cycle, and the above described image process is performed by using the two consecutive frame image data. Therefore, the image process is performed always in a real time manner while the movable body is moving, so that the image processing apparatus dealing with the actual condition of the movable body speedily can be realized.

In another aspect of the image processing apparatus of the present invention, the image taking device is installed on a front portion of the movable body.

According to this aspect, by displaying the image signal, which is from the image taking device installed on the front portion of the moveable body, on a display picture plane for example, it is possible for the user or driver to easily watch the scenery in the side direction from the front side of the movable body, which is normally difficult to watch, so that the safety of the vehicle can be further improved.

In another aspect of the image processing apparatus of the present invention, the image taking device takes the image in an oblique forward direction of the movable body.

According to this aspect, since the above described processes are performed for the image signal from the image taking device, which takes the image in the oblique forward direction of the movable body, it is possible to calculate in advance the distance to the road edge of the road portion, which is located forward of the movable body in its advancing direction, so that the moving condition of the movable body can be grasped speedily.

In another aspect of the image processing apparatus of the present invention, the image taking device takes the image in an oblique downward direction of the movable body.

According to this aspect, since the above described processes are performed for the image signal from the image taking device, which takes the image in the oblique downward direction of the movable body, it is possible to take the road edge within the angular field of view even if the movable body is close to the road edge, so that the safety of the movable body can be further improved.

The above object of the present invention can be also achieved by an image processing method of performing an image process on the basis of an image signal, which is outputted from an image taking device for taking an image on a side of a movable body and outputting the image signal corresponding to the taken image. The image processing method is provided with: a movement vector detecting process of detecting a movement vector for each area of the image taken by the image taking device, on the basis of the image signal while the movable body is moving; and a distance calculating process of judging a spatial changing rate of a magnitude of the detected movement vector and calculating the distance to a road edge on the basis of the spatial changing rate.

According to the image processing method of the present invention, the image taking operation on the side of the movable body such as a vehicle is performed and the image signal is outputted by the image taking device while the movable body is presently moving. Then, the movement vector for each area is detected. Thus, it is possible to judge the road edge separately for each area, and to thereby calculate the distance to the road edge on the basis of the magnitude of the movement vector. Therefore, the calculated distance can be utilized for securing a safety in driving, aiding the navigation operation and the like, so as to improve the safety and the convenience of the movable body.

In one aspect of the image processing method of the present invention, the image taking device has a first image taking device for taking the image on a left side of the movable body and a second image taking device for taking the image on a right side of the movable body, and the distance calculating process calculates a first distance to the road edge on the left side and a second distance to the road edge on the right side.

According to this aspect, in the movable body such as a vehicle, the image on the left side is taken by the first image taking device and the image on the right side is taken by the second image taking device, to respectively output the image signals. The processes after that are performed for the image on the left side and for the image on the right side respectively in the above mentioned manner by the movement vector detecting process and the distance calculating process, so that the distance to the road edge on the left side and the distance to the road edge on the right side are calculated. Therefore, it is possible to recognize the position of the movable body on the road by using these two distances and to thereby improve the safety and the convenience of the movable body.

In this aspect, the image processing method may be further provided with a road width calculating process of calculating a road width of the road, on which the movable body is moving, on the basis of the first distance and the second distance calculated by the distance calculating process.

According to this aspect, the road width of the road on which the movable body is presently moving can be calculated on the basis of the two distances corresponding to the left and right images of the movable body such as a vehicle. For example, in case that the image taking devices are installed on both side of the vehicle, the road width can be obtained by adding these two distances and the distance between these image taking devices. Therefore, it is possible to secure the safety in driving by using this road width, and store the road width data, so that the function and safety of the navigation for the movable body can be improved.

In another aspect of the image processing method of the present invention, the image signal comprises frame image data, which has a predetermined frame cycle, as a unit, and the movement vector detecting process detects the movement vector on the basis of two consecutive frame image data.

According to this aspect, the object of the image process is the frame image data outputted for each frame cycle, and the above described image process is performed by using the two consecutive frame image data. Therefore, the image process is performed always in a real time manner while the movable body is moving, so that the image processing method dealing with the actual condition of the movable body speedily can be realized.

The above object of the present invention can be also achieved by a navigation apparatus for performing a route guidance from a present position of a vehicle to a destination on the basis of map data, provided with: a sensor device including a vehicle speed sensor for detecting a moving speed of the vehicle; an image taking device for taking an image on a side of the vehicle and outputting an image signal corresponding to the taken image; a movement vector detecting device for detecting a movement vector for each area of the image taken by the image taking device, on the basis of the image signal while the vehicle is moving; and a distance calculating device for judging a spatial changing rate of a magnitude of the detected movement vector and calculating the distance to a road edge on the basis of the spatial changing rate.

According to the navigation apparatus of the present invention, the vehicle speed is detected by the sensor device, the image taking operation on the side of the vehicle is performed and the image signal is outputted by the image taking device. Then, the movement vector for each area is detected. Thus, it is possible to judge the road edge separately for each area, and to thereby calculate the distance to the road edge on the basis of the magnitude of the movement vector. Therefore, the calculated distance can be utilized for securing a safety in driving, aiding the navigation operation and the like, so as to improve the safety and the convenience of the vehicle.

In one aspect of the navigation apparatus of the present invention, the navigation apparatus is further provided with a warning device for warning that the vehicle is close to the road edge if the calculated distance to the road edge is smaller than a threshold value, which is set in advance.

According to this aspect, on the basis of the distance to the road edge, it is judged that the vehicle is too close to the road edge, and warns it to the driver, so that the safety and the convenience of the vehicle can be further improved.

In this aspect, the navigation apparatus may be further provided with a road width calculating device for calculating a road width of the road, on which the vehicle is moving, on the basis of the calculated distance to the road edge.

By constituting in this manner, the road width of the road on which the movable body is presently moving can be calculated. For example, in case that the image taking devices are installed on both side of the vehicle, the road width can be obtained by adding these two distances and the distance between these image taking devices. Therefore, it is possible to secure the safety in driving by using this road width, and store the road width data in correlation with the map data, so that the function and safety of the navigation for the vehicle can be improved.

In this aspect having the road width calculating device, the navigation apparatus may be further provided with a road width data memory for storing road width data corresponding to the calculated road width in correlation with the map data such that the road width data can be updated.

By constituting in this manner, the road width data corresponding to the calculated road width is stored into the map data memory such that it can be updated. Therefore, since the road width data of the road on which the vehicle has moved can be held, and can be utilized later on when the vehicle moves on the same road again, it is possible to aid the function of the navigation apparatus.

In this aspect having the road width calculating device, the navigation apparatus may be further provided with: a traffic lane judging device for judging a traffic lane, on which the vehicle is presently moving, on the basis of calculation results of the distance calculating device and the road width calculating device; and a warning device for warning an appropriate traffic lane, on which the vehicle is to move, by correlating the judged traffic lane with a route to the destination.

By constituting in this manner, when the vehicle moves on a road having a plurality of traffic lanes, the traffic lane, on which the vehicle is presently moving, is judged by the traffic lane judging device, on the basis of the distance to the road edge and the road width. Then, the judged traffic lane is correlated with the optimum route to the destination, and the warning is given to the driver so as to drive the vehicle on the appropriate traffic lane corresponding to the optimum route. Therefore, it is possible to caution the driver to drive the vehicle on the traffic lane corresponding to the optimum route, so that the comfortable navigation apparatus can be realized.

In this aspect having the traffic lane judging device and the warning device, the warning device may warn the appropriate traffic lane if the judged traffic lane is not coincident with the appropriate traffic lane.

By constituting in this manner, the judged traffic lane is correlated with the optimum route to the destination, and the appropriate traffic lane is warned to the driver when it is judged that the vehicle is not moving on the appropriate traffic lane. Therefore, while unnecessary warning is avoided when the vehicle is moving on the appropriate lane, the comfortable navigation apparatus can be realized by virtue of minimal warning.

In this aspect having the traffic lane judging device and the warning device, the warning device warns that the judged traffic lane is coincident with the appropriate traffic lane if the judged traffic lane is coincident with the appropriate traffic lane.

By constituting in this manner, the judged traffic lane is correlated with the optimum route to the destination, and, if it is judged that the vehicle is moving on the appropriate traffic lane, this fact is warned to the driver. Therefore, by informing the drive that the vehicle is moving on the appropriate traffic lane, the comfortable navigation apparatus giving the safety feeling to the driver can be realized.

The above object of the present invention can be also achieved by a program storage device readable by a computer, tangibly embodying a program of instructions executable by the computer to perform an image process on the basis of an image signal, which is outputted from an image taking device for taking an image on a side of a movable body and outputting the image signal corresponding to the taken image. The image process includes: a movement vector detecting process of detecting a movement vector for each area of the image taken by the image taking device, on the basis of the image signal while the movable body is moving; and a distance calculating process of judging a spatial changing rate of a magnitude of the detected movement vector and calculating the distance to a road edge on the basis of the spatial changing rate.

According to the program storage device of the present invention, as the computer reads in and executes the program stored therein, it is possible to realize the above described image processing apparatus of the present invention on the computer.

The above object of the present invention can be also achieved by a computer data signal embodied in a carrier wave and representing a series of instructions which cause a computer to perform an image process on the basis of an image signal, which is outputted from an image taking device for taking an image on a side of a movable body and outputting the image signal corresponding to the taken image. The image process includes: a movement vector detecting process of detecting a movement vector for each area of the image taken by the image taking device, on the basis of the image signal while the movable body is moving; and a distance calculating process of judging a spatial changing rate of a magnitude of the detected movement vector and calculating the distance to a road edge on the basis of the spatial changing rate.

According to the computer data signal embodied in the carrier wave of the present invention, as the computer downloads and executes the program in the computer data signal, it is possible to realize the above described image processing apparatus of the present invention on the computer.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, an embodiment of the present invention will be now explained.

Figure 1:
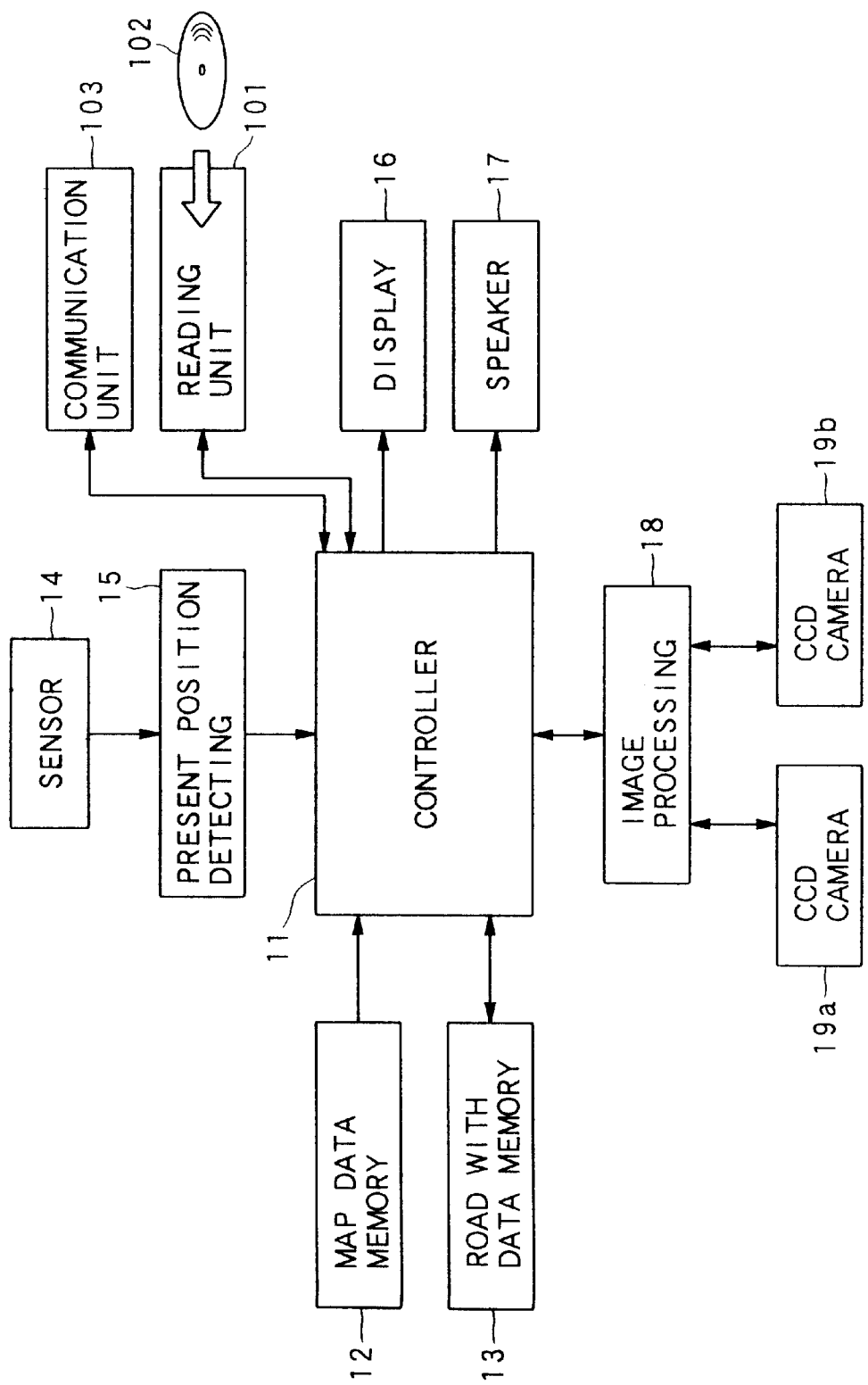
FIG. 1 is a block diagram showing a schematic construction of a navigation apparatus as an embodiment of the present invention.

In FIG. 1, a navigation apparatus as an embodiment of the present invention is provided with a controller 11, a map data memory 12, a road width data memory 13, a sensor unit 14, a present position detecting unit 15, a display unit 16, a speaker 17, an image processing unit 18, and CCD cameras 19a and 19b.

In the above mentioned construction, the controller 11 controls an operation of the navigation apparatus on the whole. The controller 11 is constructed by a CPU or the like. The controller reads and executes a control program stored in a ROM not illustrated, transmits a control signal to each constitutional element of the navigation apparatus, and inputs and outputs various data.

The map data memory 12 is a large capacity memory, for storing the map data, and is constituted by a CD-ROM or a DVD-ROM for example. The map data stored in the map data memory 12 include road shape data, name data, background data and so on.

The road data memory 13 is a memory for storing the road width data, which is obtained by an image process of the present invention described layer in detail, of a road where the vehicle is presently traveling, such that the stored road width data can be updated. Rough road width data may be included in the map data stored in the map data memory 12. The road width data stored in the road width data memory 13 is more detail than this rough road width data, and is data in which the road width which changes depending upon the position of the road is accurately obtained. The method of generating the road width data will be described later in detail.

The sensor unit 14 includes various sensors required for detecting the present position of the vehicle. More concretely, the sensor unit 14 includes a vehicle speed sensor for detecting a speed of the vehicle, an azimuth sensor for detecting an azimuth changing amount of the vehicle, a GPS (Global Positioning System) receiver for receiving electric waves from GPS satellites and so on.

The present position detecting unit 15 calculates a present position of the vehicle on the basis of output signals from the sensor unit 14, and outputs the present position data. Incidentally, the present position data is correlated with the aforementioned map data by the controller 11 to be corrected by means of a map matching technique or the like.

On the display unit 16, the map data is displayed in various aspects under the control of the controller 11, and the present position of the vehicle is superimposed and displayed on this map data as a car mark. The display unit 16 may be constructed by a CRT (Cathode Ray Tube), an LCD (Liquid Crystal Device) or the like. From the speaker 17, guidance information along the route of the vehicle is voice-outputted, and the later described guidance information is voice-outputted in association with the image process of the present invention.

The image processing unit 18 analyzes the image signals from the CCD cameras 19a and 19b, which are installed in the vehicle, to perform the image process of the present invention. Here, the construction and the operation of the image processing unit 18 are explained with reference to FIG. 2.

Figure 2:
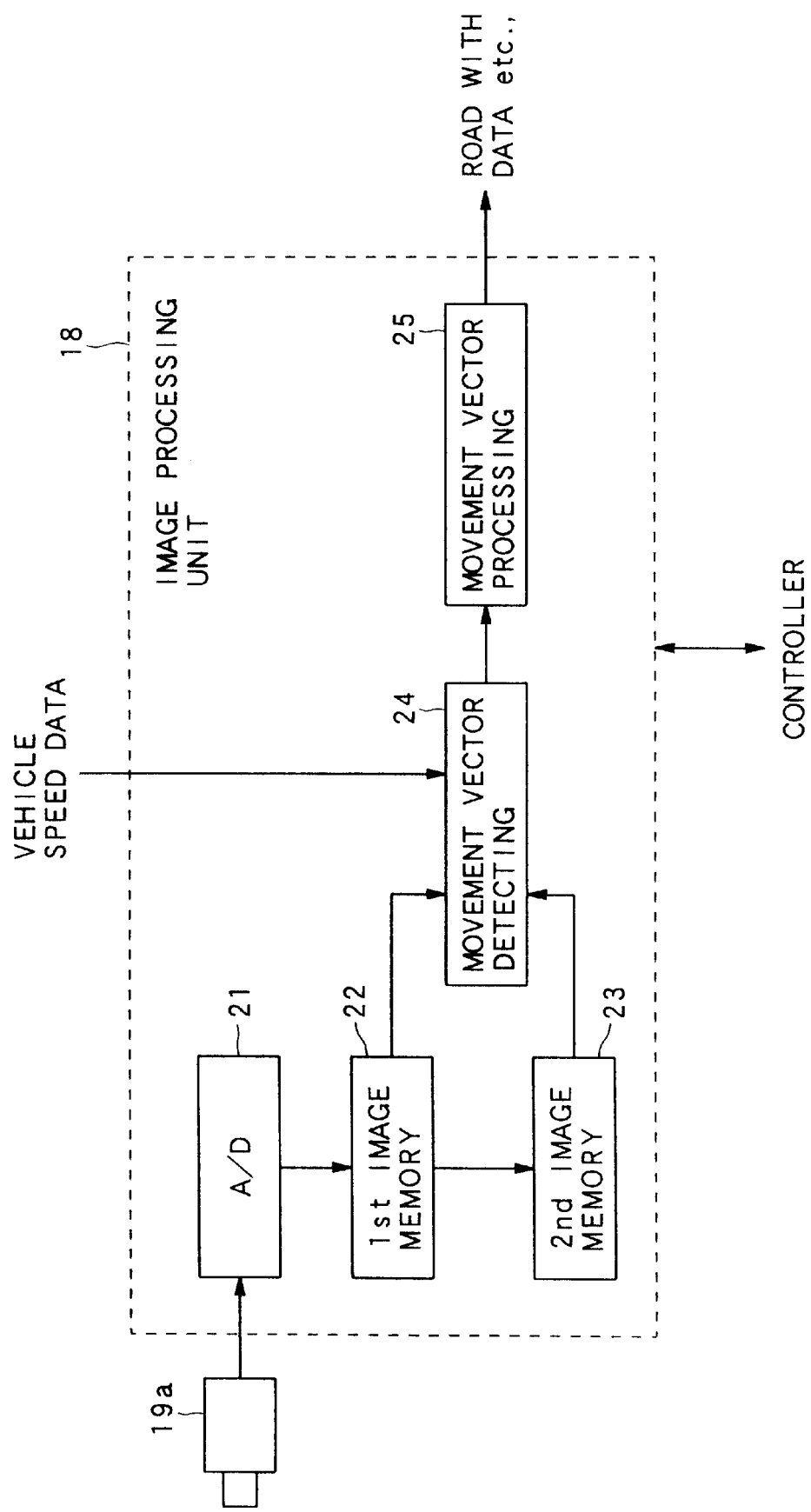
FIG. 2 is a block diagram showing a construction of an image processing unit of the navigation system of FIG.1.

As shown in FIG. 2, the image processing unit 18 is provided with an A/D convertor 21, a 1st image memory 22, a 2nd image memory 23, a movement vector detecting unit 24, and a movement vector processing unit 25. The image processing unit 18 is operated in accordance with the control signal from the controller 11. Incidentally, although the image processing unit 18 actually processes the image signals from the CCD cameras 19a and 19b, the case is explained here in which the image signal form just one CCD camera 19a is processed, for the sake of simplicity.

In FIG. 2, the A/D convertor 21 converts an analog image signal based on an image taken by the CCD 19a to a digital image signal. Normally, the digital image signal outputted from the A/D convertor 21 constitutes one frame image data for each predetermined frame cycle. In other word, the digital image signal comprises a continuous plurality of frame image data.

The 1st image memory 22 and the 2nd image memory 23 store the frame image data outputted from the A/D convertor 21 respectively. The 1st image memory 22 stores the current frame image data, while the 2nd image memory 23 stores the one previous frame image data. Therefore, the image data in two-frames-amount is always held in the image processing unit 18 by those two memories, and is used to perform the later described process.

The movement vector detecting unit 24 detects a movement vector for each area within the image, on the basis of the frame image data stored in the 1st image memory 22 and the 2nd image memory 23. At this time of detection, the vehicle speed data outputted from the sensor unit 14 is also used.

The movement vector processing unit 25 obtains a distance to a road edge of a road where the vehicle is presently traveling and further obtains the road width based on this distance to the road edge, on the basis of the movement vector detected by the movement vector detecting unit 24, and outputs them as distance data and/or road width data.

Incidentally, the detailed processes in the movement vector detecting unit 24 and the movement vector processing unit 25 will be described later.

In FIG. 1 again, the CCD cameras 19a and 19b are installed at a vicinity of both side edges of the front portion of the vehicle respectively, so as to take the images on left and right sides of the vehicle and output the image signals respectively. Here, the condition of setting the CCD cameras 19a and 19b is shown in FIG. 3A and 3B.

Figure 3A:
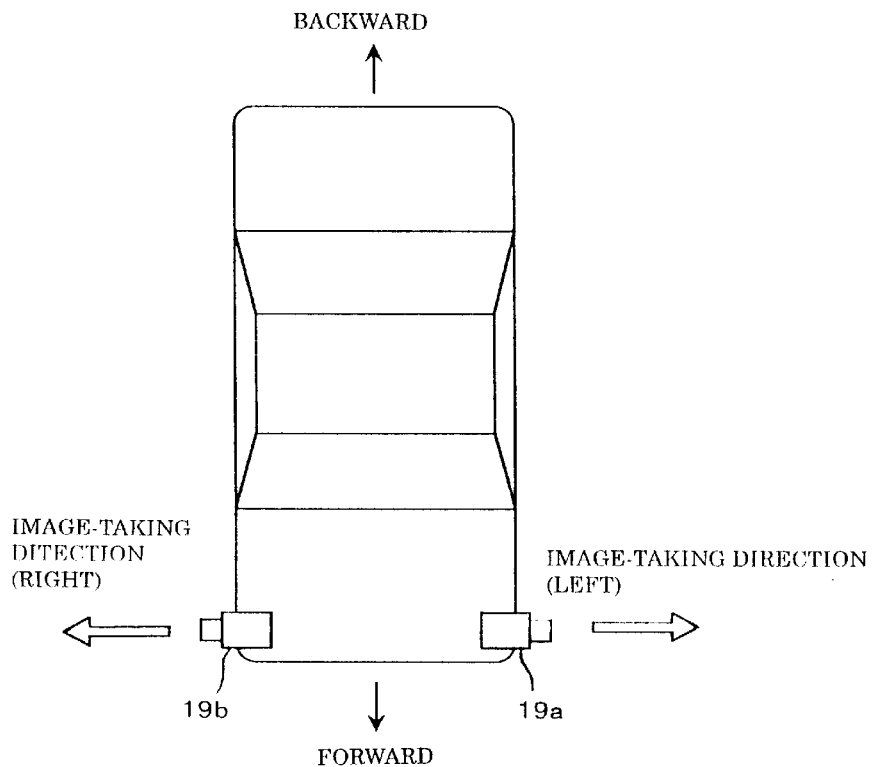
FIG. 3A is a diagrammatic plan view of a vehicle showing a condition of setting a CCD camera to the vehicle in the embodiment.

FIG. 3A is a diagram showing the condition of setting the CCD cameras 19a and 19b seen from an upward direction of the vehicle. As shown in FIG. 3A, the CCD cameras 19a and 19b are installed on the upper portion of the vehicle body at the left and right sides and at the front side of the vehicle. The CCD camera 19a is installed at the left side of the vehicle while the CCD camera 19b is installed at the right side of the vehicle. The CCD camera 19a is set such that it can take the image for the left side of the vehicle. The CCD camera 19b is set such that it can take the image for the right side of the vehicle. The CCD cameras 19a and 19b are set symmetrical to each other.

Figure 3B:
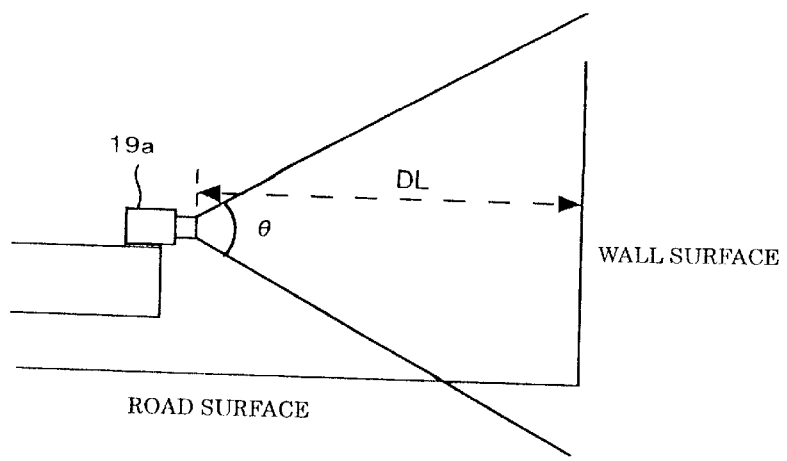
FIG. 3B is a diagrammatic side view of the vehicle showing the condition of setting the CCD camera to the vehicle in the embodiment.

FIG. 3B is a diagram showing the condition of setting the CCD camera 19a seen from a forward direction of the vehicle together with the range to be image-taken by the CCD camera 19a. Incidentally, for the sake of simplicity, only the image-taking condition for the left side of the vehicle is illustrated. As shown in FIG. 3B, the CCD camera 19a is adapted to image-take the range in an image angle θ (i.e., an angular field of view) toward a wall surface. The CCD 19a is preferably installed such that the taken image includes the wall surface at the upper portion thereof and the road surface at the lower portion thereof. In the present invention, a distance DL to the road edge on the left side is calculated on the basis of the image taken by the CCD camera 19a.

The CCD camera 19a is installed to a position at a height of about 1 m of the vehicle. On the other hand, in case of the CCD camera 19b, the image taking condition is symmetrical to that shown in FIG. 3B, so that a distance DR to the road edge on the right side is calculated on the basis of the image taken by the CCD camera 19b.

In FIG. 1 again, the navigation apparatus is further provided with a reading unit 101 and a communication unit 103.

The later described navigating operations including the image process on the navigation apparatus are executed mainly by the controller 11 and the image processing unit 18, after the reading unit 101 installs a computer program stored in a record medium 102 such as, for example, a CD-ROM, a DVD-ROM and the like, into the navigation apparatus. Alternatively, such a computer program may be downloaded to the navigation apparatus by the communication unit 103 through a network such as an internet. Such a computer program may be stored in the same memory as the map data memory 12 and/or the road width data memory 13.

Next, the principle of the image process of the present invention is explained with reference to FIG. 4 to FIG. 8.

Figure 4:
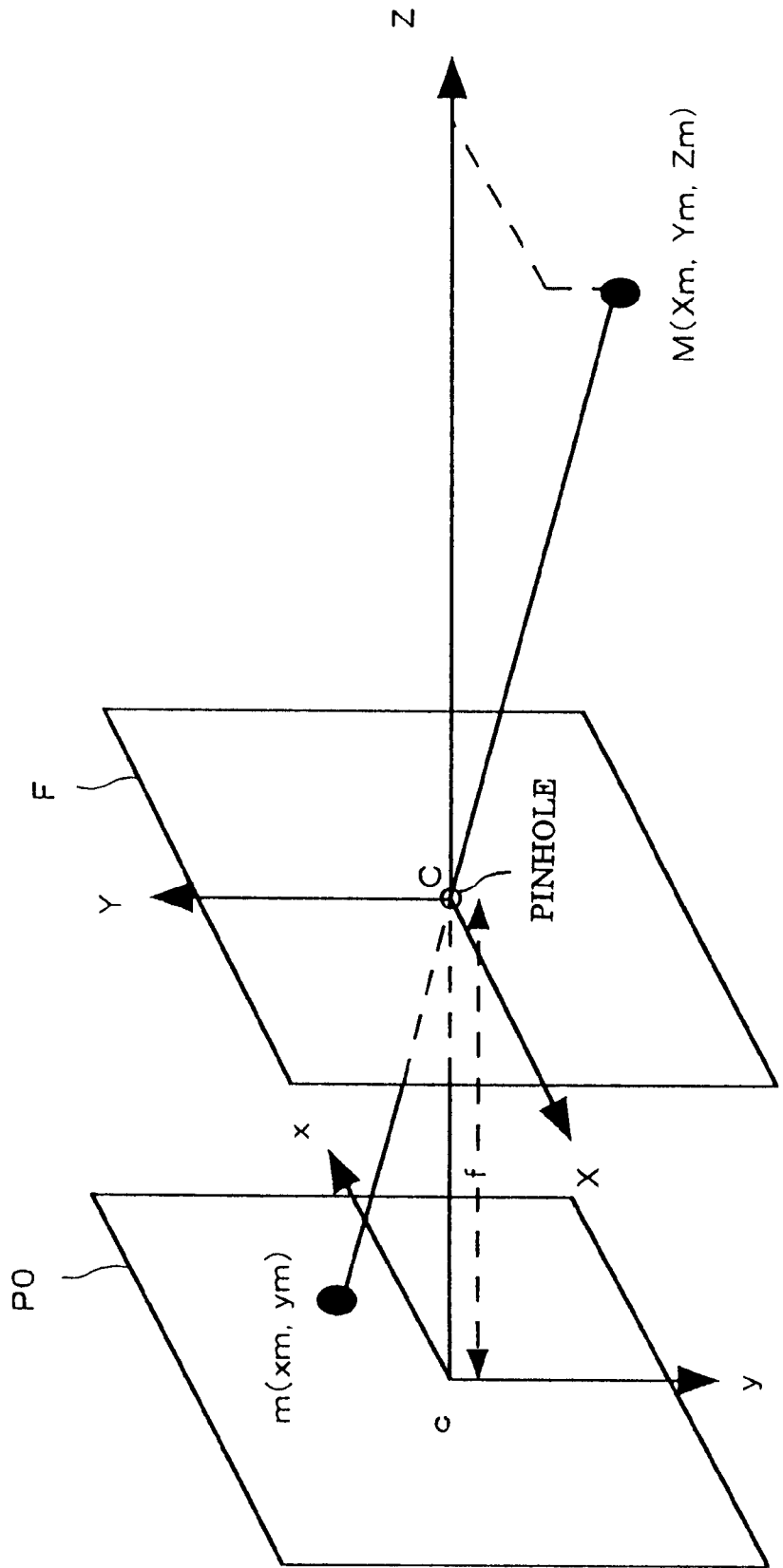
FIG. 4 is a diagram showing an image taken by the CCD camera in the embodiment by means of a model of a pinhole camera.

FIG. 4 is a diagram showing the image taken by the above mentioned CCD cameras 19a and 19b by using a model of a pinhole camera. In FIG. 4, an image plane P0 corresponding to the light receiving element portion of the CCD camera 19a and a focal plane F corresponding to a lens portion of the CCD camera 19a are disposed in parallel to each other with an interval of focal distance f. A lens center C of the focal plane F corresponds to a pinhole. A space coordinate system (X,Y,Z) is set with this lens center C as a coordinate center. On the other hand, on the image plane P0, a camera coordinate system (x, y) is set with a space coordinate (0, 0, −f) as an image center c.

Here, a point M (Xm, Ym, Zm) on the space coordinate system is considered. The point M may correspond to a predetermined position on a wall surface shown in FIG. 3B, for example. A central projection corresponding to this point M is projected to a point m (xm, ym) on the camera coordinate system by a straight line connected from the point M to the image plane P0 through the lens center C on the focal plane F.

At this time, the relationship between the point M (Xm, Ym, Zm) and the projection point m (xm, ym) is expressed by following equations (1).

$$xm = f \times Xm/Zm$$
$$ym = f \times Ym/Zm \qquad (1)$$

Figure 5:
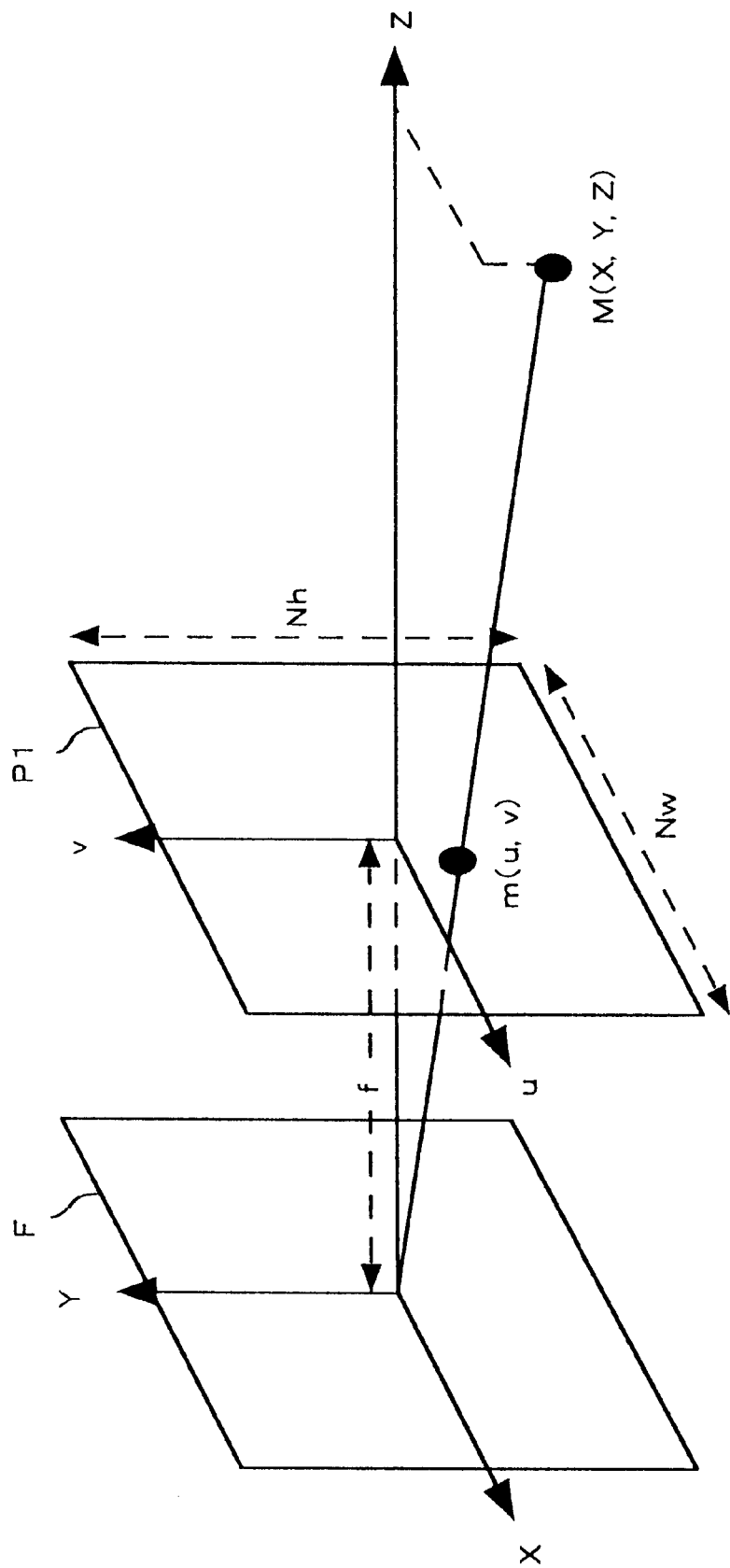
FIG. 5 is a diagram showing a relationship between a space coordinate system and a pixel coordinate system of image data in the embodiment.

Next, FIG. 5 is a diagram showing the relationship between the space coordinate system (X, Y, Z) and a pixel coordinate system (u, v) of the image data, in correspondence with FIG. 4. In FIG. 5, for the sake of simplicity, the pixel coordinate system (u, v) is set by positioning the image plane P0 of FIG. 4 on a forward side of the focal plane F and, by inverting the x axis and y axis on the camera coordinate system (x, y) to the u axis and v axis respectively. Even if the arrangement of FIG. 4 is replaced by the arrangement of FIG. 5, since those arrangements are equivalent to each other, the same relationships are validated.

In FIG. 5, the image plane P1 on the pixel coordinate system corresponds to the display image in which the number of pixels is Nw in the horizontal direction and the number of pixels is Nh in a vertical direction, so that the Nw×Nh pixels are included on the pixel plane P1 in total. On the other hand, the image plane P1 coincides with the light receiving area of the CCD camera 19a or 19b in which the lateral width is w and the height is h. If the point M (X, Y, Z) on the space coordinate system is considered in the same manner as FIG. 4, it is connected by a straight line passing through the point m (u, v) on the image plane P1 to the lens center C on the focal plane F as shown in FIG. 5.

Here, if the central projection with respect to the point m is considered in the same manner as FIG. 4, the relationship between the point M (X, Y, Z) and the projection point m (u, v) is expressed by following equations (2) in correspondence with the aforementioned equations (1).

$$u=(f \times X/Z) \times Nw/w$$
$$v=(f \times Y/Z) \times Nh/h \qquad (2)$$

Namely, the equations (2) express the pixel position of the point m (u, v) on the image plane P1. In the equations (2), u corresponds to the pixel position in the horizontal direction, while u corresponds to the pixel position in the vertical direction.

In the present embodiment, since the image taken from the vehicle which is presently traveling is processed, the movement of an object within the image plane P1 is considered. Thus, an optical flow on the image plane P1 i.e., a movement vector V (u, v) is to be obtained. Assuming that a light intensity I at the same point in the 3 dimensional space is kept constant, a next time-space differential equation (3) is validated.

$$dI/dt = Ix \times u + Iy \times v + It = 0 \qquad (3)$$

In this equation (3), within the image plane P1 respectively, Ix represents a partial differential in the horizontal direction, Iy is a partial differential in the vertical direction, It is a partial differential in the time axis direction, u is a component of the aforementioned movement vector V in the horizontal direction, and v is a component of the aforementioned movement vector V in the vertical direction.

Next, the method of obtaining the movement vector V is explained with reference to FIG. 6 and FIG. 7.

Figure 6:
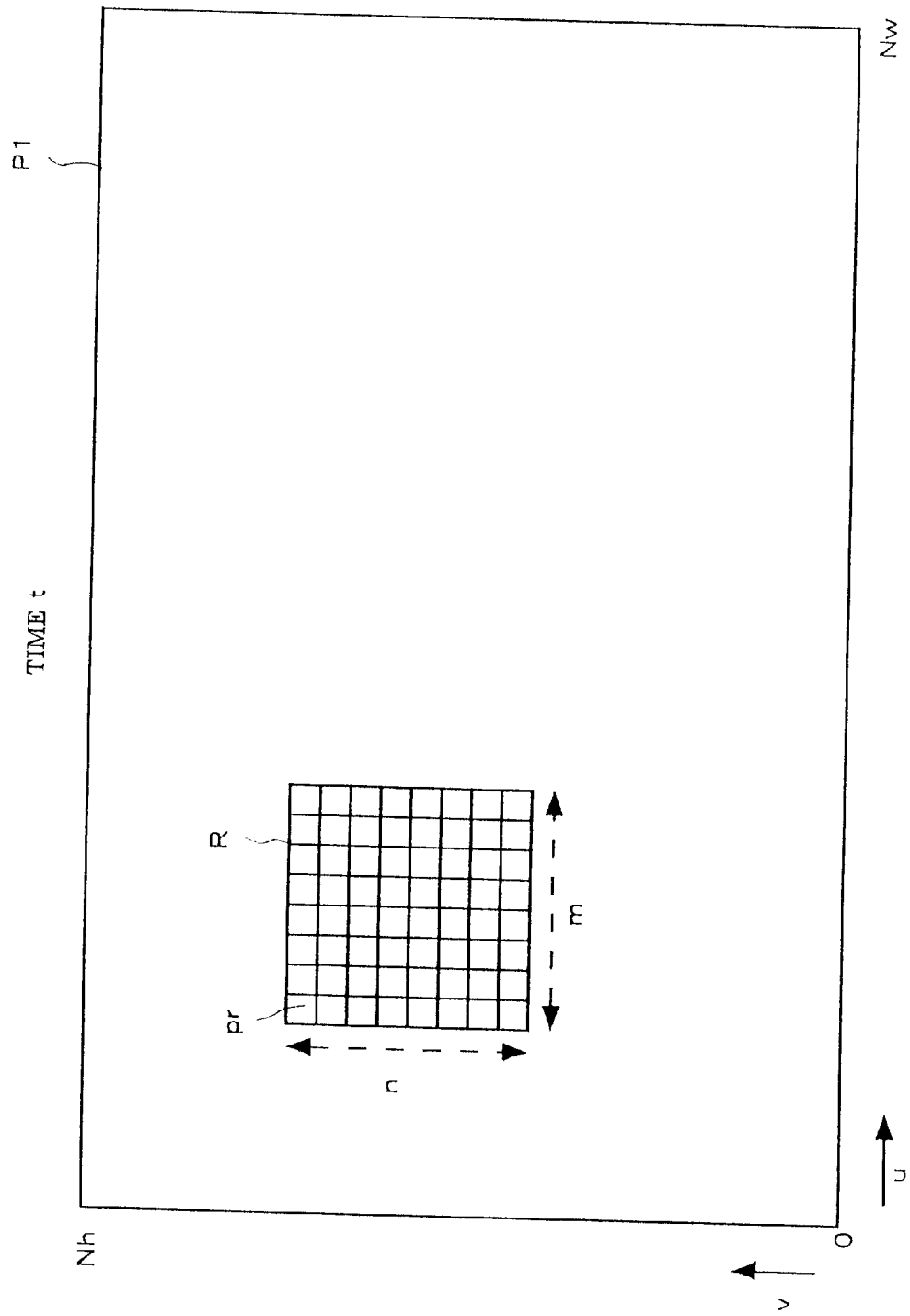
FIG. 6 is a diagram for explaining a reference block defined within an image plane when obtaining a movement vector in the embodiment.

A reference block R is defined within the image plane P1 at the time t as shown in FIG. 6. This reference block R is a rectangular shaped area within a range of m pixels along the u axis and n pixels along the v axis with the pixel pr at the left upper corner thereof as a starting point, and includes m×n pixels in total. Then, the image plane P1 is divided into a plurality of reference blocks R, and the movement vector V is obtained for each reference block R. In the example of FIG. 6, the reference block R in which m=8 and n=8 is indicated.

Figure 7:
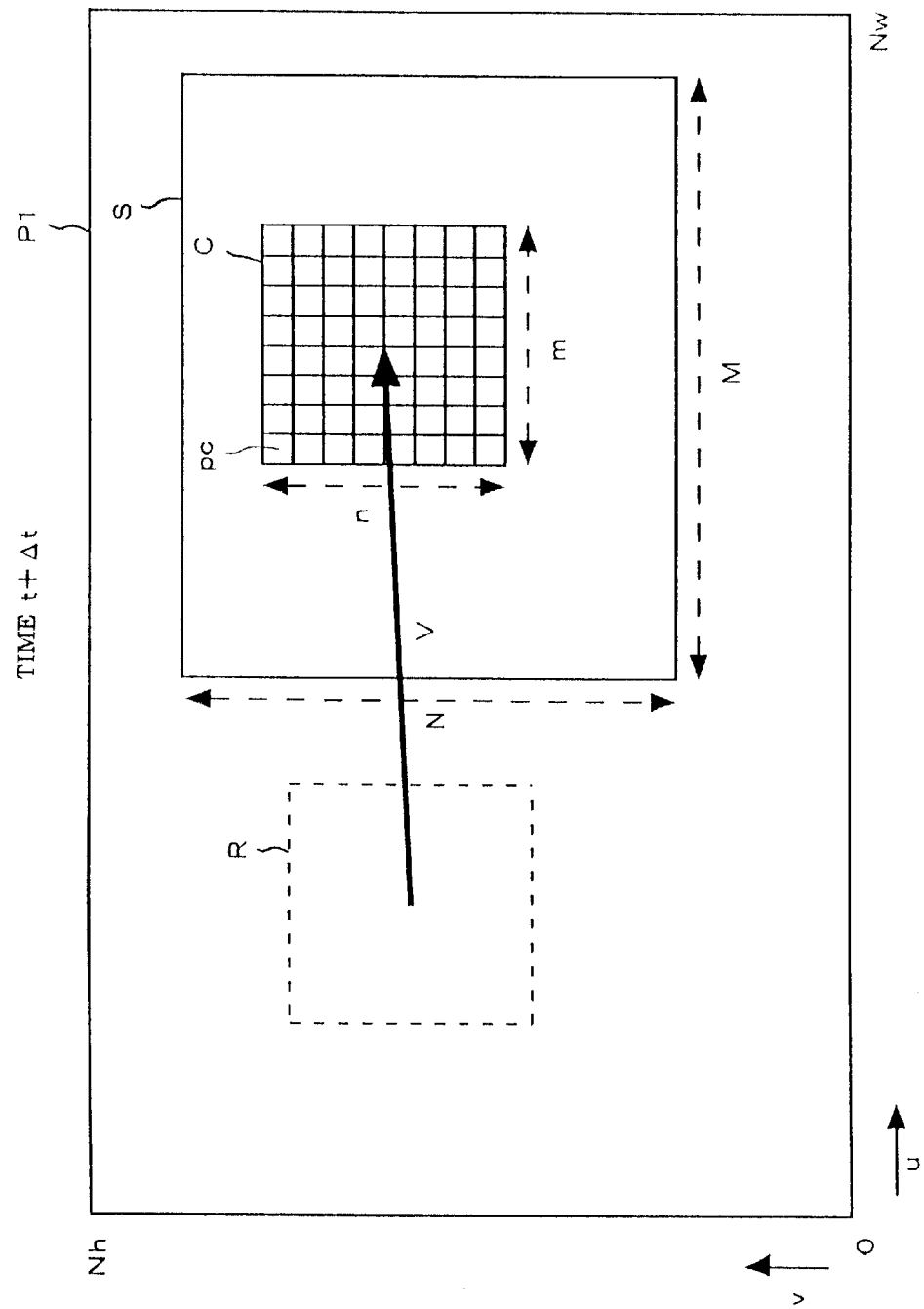
FIG. 7 is a diagram for explaining a method of obtaining the movement vector by defining a comparison block within a search range, with respect to the reference block within the image plane in the embodiment.

FIG. 7 is a diagram for explaining the method of obtaining the movement vector V for the reference block R within the image plane P1. FIG. 7 corresponds to the image plane P1 at the time t+Δt when the time duration Δt has elapsed from the time t of FIG. 6. On the basis of the vehicle speed data etc., from the sensor unit 14, a predetermined area within the image plane P1 is defined as a search range S in advance. The search range S is a rectangular shaped area having M pixels along the u axis and N pixels along the v axis, in which the values of M and N are larger than the values of m and n respectively.

With respect to the search range S, a comparison block C having the same size as the reference block R is defined at a predetermined position. Since the size of the search range S is significantly larger than that of the reference block R, the position of the comparison block C is gradually moved within the search range S little by little. In FIG. 7, the comparison block C has the m×n size same as the reference block R, and indicates the pixel pc at the left upper corner of the comparison block C corresponding to the pixel pr at the left upper corner of the reference block R. At first, the pixel of at the left upper corner of the search range S is set as the pixel pc of the comparison block C, and after that, the position of the pixel pc is moved one pixel by one pixel in the u axis direction or the v axis direction within the search range S, so that the later described calculation is performed for all the reference blocks C which can be defined within the search range S.

Subsequently, the correlation value between the reference block R at the time t in FIG. 6 and the comparison block C at the time t+Δt in FIG. 7 is obtained. Here, since, in the image data which is a set of pixels, the density value is made correspondent with each of the m×n pixels, the difference in the density values is obtained for each corresponding pixels of the comparison block C and the reference block R. By calculating a sum of the differences in the density values of the respective m×n pixels, the correlation value can be calculated.

Then, the correlation value between the reference block R and the comparison block C is obtained for all the comparison blocks C within the search range S, and the comparison block C, which gives the minimum correlation value, is searched. For example, it is assumed here that the comparison block C shown in FIG. 7 gives the minimum correlation value.

In this case, as shown in FIG. 7, it is possible to determine a vector, which is directed toward the comparison block C at the time t+Δt from the reference block R at the time t indicated by a dashed line in the image plane P1, as the movement vector.

In FIG. 7, although only one movement vector V is illustrated, the movement vector V is actually obtained for all the reference blocks R which can be defined within the image plane P1. By this, the spatial distribution of the movement vectors V is obtained. The, on the basis of the spatial distribution of the movement vectors V, the later described process is performed.

Next, the method of calculating the aforementioned distance DR and Dl and the road width is explained.

Figure 8:
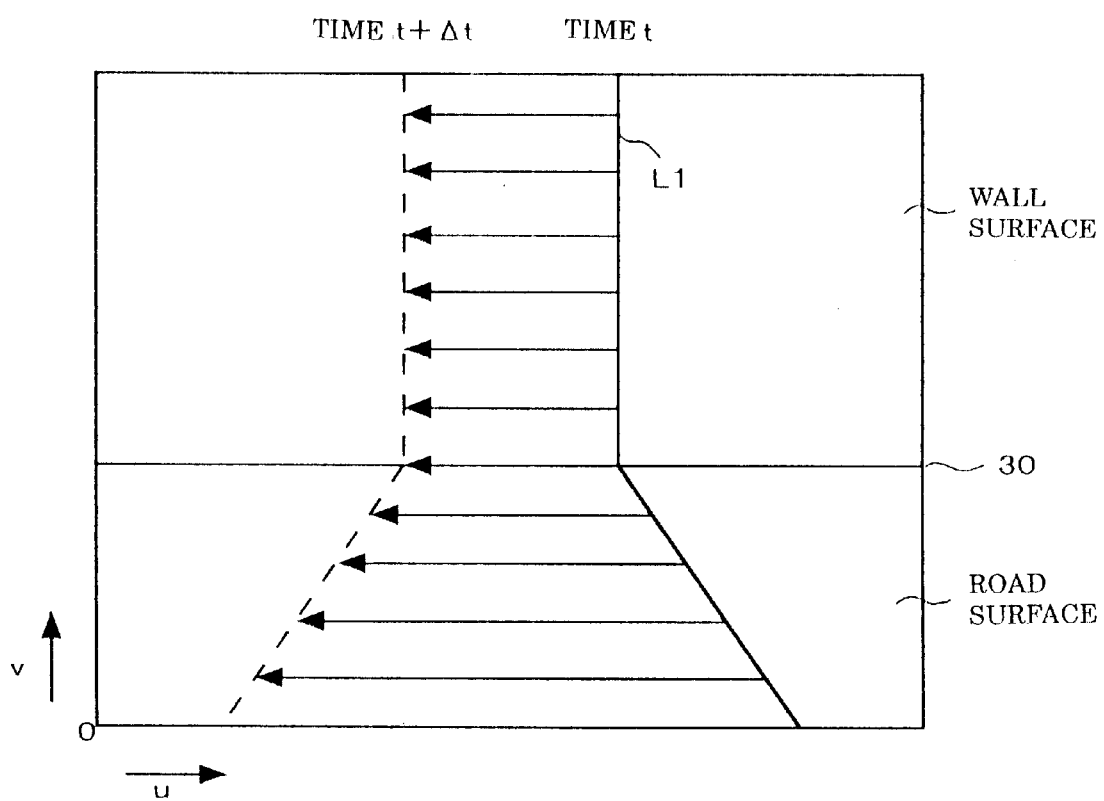
FIG. 8 is a diagram for explaining a method of calculating a distance to a road edge and a road width in an image process in the embodiment.

FIG. 8 is a diagram showing one example of the spatial distribution of the movement vectors V in the image taken by the CCD camera 19a. In FIG. 8, for the sake of simplicity, it is assumed that the road surface and the wall surface contact with each other at a boundary portion 30 at the lateral side direction of the vehicle in the same manner as the case of FIG. 3B. Also, the distribution of the movement vectors V on the line L1 at the time t is considered here.

As shown in FIG. 8, in the image taken by the CCD camera 19a, the magnitude of the movement vector V is constant on the wall surface, which is located at the upper portion of the boundary portion 30. On the contrary, the magnitude of the movement vector V changes at a roughly constant changing rate on the road surface, which is located at the lower portion of the boundary portion 30. In this manner, the magnitude of the movement vector V is a value depending upon a distance z to the image-taken object.

Namely, when taking the image by the CCD camera 19a at a frame cycle T in the vehicle, which is traveling at a speed v0 [m/sec], a movement distance d of the vehicle during one frame is expressed by a following equation (4).

$$d = v0 \times T \ [m] \qquad (4)$$

Here, assuming that the image-taken object relatively moves only in the u direction with respect to the vehicle and does not move in the v or z direction, a following equation (5) is validated by substituting x=d in the aforementioned equations (2).

$$u=(f \times d/z) \times Nw/w = (f \times v0 \times T/z) \times Nw/w \qquad (5)$$

By the value u expressed in the equation (5), the movement vector V(u, 0) is determined. This value u coincides with the magnitude of the movement vector V. In this manner, the magnitude of the movement vector V is inversely proportional to the distance z to the image-taken object.

Figure 9:
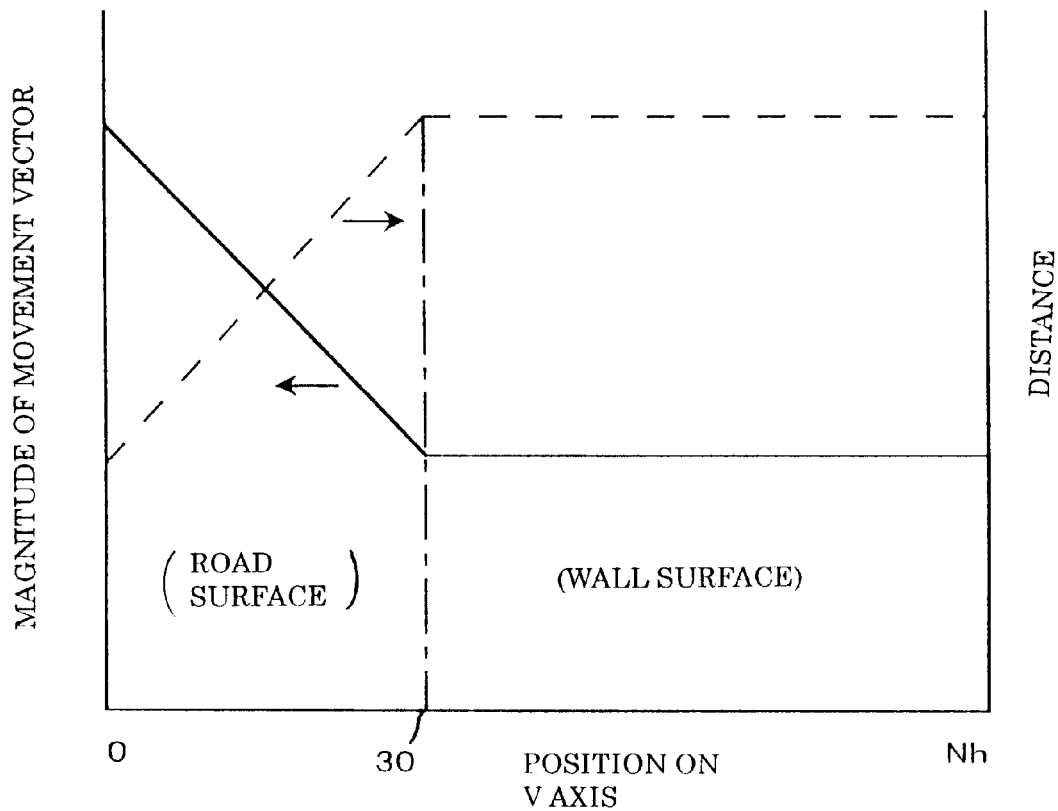
FIG. 9 is a diagram for explaining how the magnitude of the movement vector within the image is changed and how the distance to the wall surface is changed in the embodiment.

FIG. 9 is a diagram showing how the magnitude of the movement vector V on the line L1 changes in correspondence with the equation (5). In FIG. 9, the magnitude of the movement vector V of the image-taken object is indicated by a solid line and the distance z is indicated by a dashed line versus the v axis of the image in FIG. 8. As understood from FIG. 8, since the distance z is constant for the wall surface, the magnitude of the movement vector V is also constant. On the contrary, since the distance z decreases at a roughly constant rate toward the lower portion for the road surface, the value u in the equation (5) linearly increases.

Therefore, it is possible to distinguish the wall surface and the road surface from each other on the basis of whether or not the movement vector V is roughly constant without changing at the roughly constant changing rate, in FIG. 9, so that the position of the boundary 30 can be also judged. Then, assuming that the average value of the movement vector V for the wall surface is MV (pixel), the distance DL to the wall surface can be calculated by a flowing equation (6) based on the equation (5).

$$DL=(f \times v0 \times T/MV) \times Nw/w \quad (6)$$

Incidentally, in case that a groove exists at the road edge, although the movement vector V decreases at a roughly constant changing rate toward the upper portion of the image for the road surface, the changing rate of the movement vector V is not locally constant but drastically changes at the boundary between the road surface and the groove. Thus, it is possible to detect the groove by judging this discontinuous point as for the changing rate, and to thereby obtain the distance DL to the road edge on the basis of the magnitude of the movement vector V before and after the groove.

In case that the wall surface is not a single surface but a partial wall surface such as a guardrail for example, there may be a plurality of areas where the movement vector V is roughly constant. In such a case, the discontinuous point is detected in the above mentioned manner and the distance DL for the plurality of areas are obtained, so as to use the minimum distance DL as the distance DL to the road edge. In case that the guardrail is adjacent to the road edge, it is possible to obtain the distance D to the road edge on the basis of the distance to the area corresponding to the guardrail.

As concrete examples of various numerical values in the equation (5), the focal distance f=4 [mm], the number of pixels in the horizontal direction Nw=320 [pixels], the lateral width of the light receiving area w=4 [mm] and the frame cycle T=1/30[sec].

By applying the above described image process onto the images taken by the CCD cameras 19a and 19b in the same manner, it is possible to obtain the distances DL and DR to the road edge on the left and right side of the vehicle. Therefore, by adding those distances DL and DR and taking the lateral width of the vehicle body into the consideration, the road width of the road where the vehicle is presently traveling can be calculated. For example, if the vehicle has a lateral width W in the setting condition shown in FIG. 2B, the road width W can be approximately calculated by a following equation (7).

$$RW=DL+DR+W \quad (7)$$

Incidentally, if the road width data corresponding to the calculated road width RW is stored in the road width data memory 13 in correlation with the map data such that the road width data can be updated, it can be used for the later described various processes.

Figure 10:
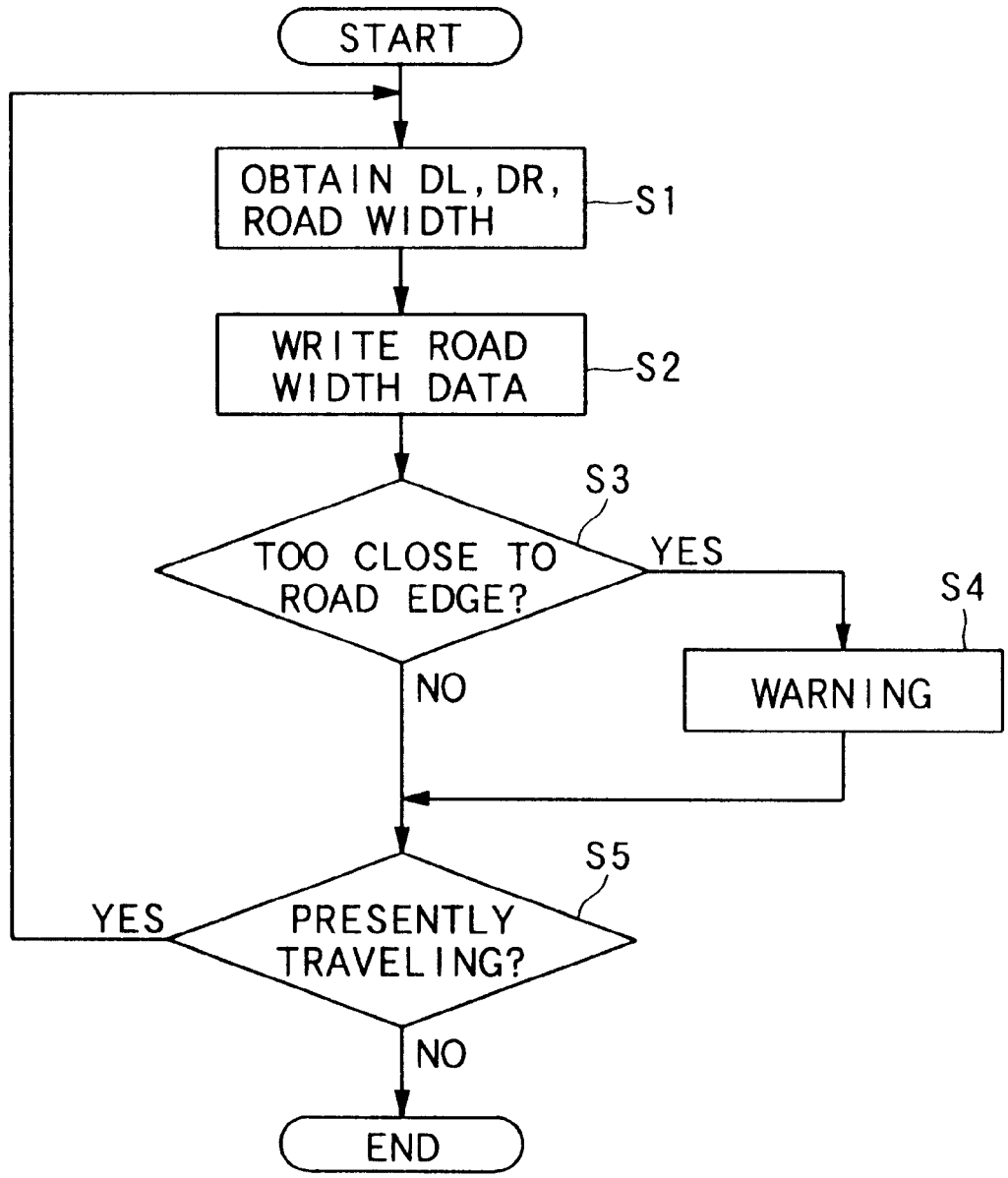
FIG. 10 is a flow chart showing a process of preventing a presently traveling vehicle is positioned too close to the road edge, in correspondence with a road width detection in the navigation apparatus of the embodiment.
Figure 11:
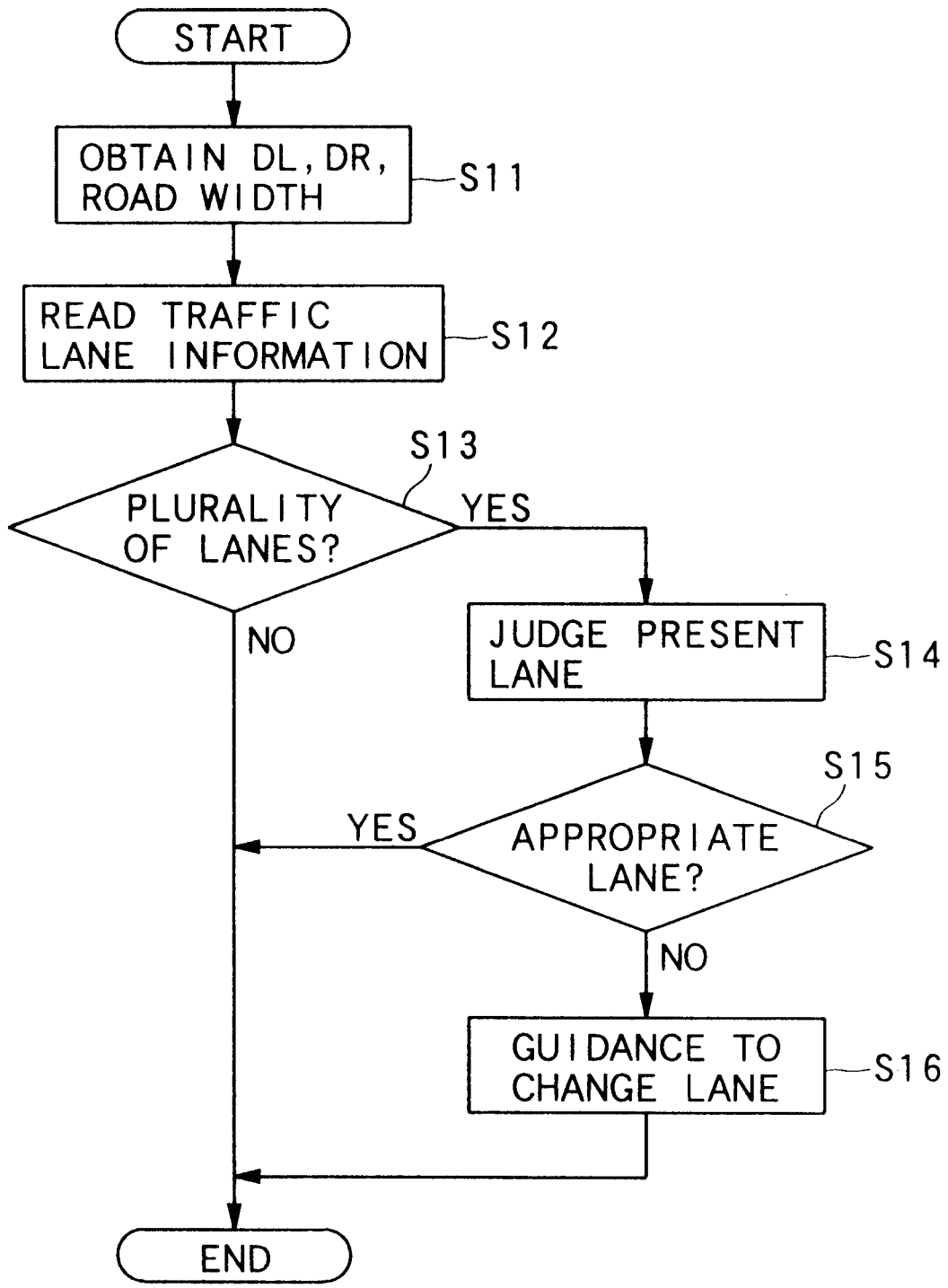
FIG. 11 is a flow chart showing a process of allowing the vehicle to travel on an appropriate traffic lane for a set route when the vehicle is presently traveling on a road having a plurality of traffic lanes, in correspondence with a road width detection in the navigation apparatus of the embodiment.

Next, the actual image processes in the navigation apparatus of the present embodiment are explained with reference to FIG. 10 and FIG. 11. FIG. 10 is a flow chart showing the process of preventing the presently traveling vehicle from approaching too close to the road edge. FIG. 11 is a flow chart showing the process of allowing the vehicle to travel on an appropriate traffic lane for a set route when the vehicle is presently traveling on a road having a plurality of traffic lanes. The processes shown in FIG. 10 and FIG. 11 are performed mainly under the control of the controller 11.

In FIG. 10, when the process is started, the distances DL and DR to the road edges on both sides are obtained by the above described process of the image processing unit 18, and the road width RW is calculated on the basis of those distances DL and DR (step S1). Then, the road width data corresponding to the road width RW calculated by the step S1 is written into the road width data memory 13 in correlation with the map data (step S2). At this time, it may be performed to write the road width data at each point on the road set in advance.

Then, on the basis of the distances Dl and DR calculated by the step S1, it is judged whether or not the presently traveling vehicle is too close to the road edge (step S3). Namely, it may be judged that the vehicle is too close to the road edge if the distance DL or DR is smaller than a predetermined value, which is set in advance as a standard value.

If the judgment result is "YES" in the step S3, it is warned to the driver that the vehicle is too close to the road edge (step S4). For example, a predetermined message indicating that the vehicle is too close to the road edge is voice-outputted from the speaker 17. Alternatively, such a message, a predetermined display mark or the like may be displayed on the display unit 16.

If the judgment result in the step S3 is "NO" or after completing the process at the step S4, it is judged whether or not the vehicle is presently traveling (step S5). If the vehicle is not presently traveling (step S5: NO), since it is not necessary to perform the image process, the processes are ended. On the other hand, if the vehicle is still presently traveling (step S5: YES), the operation flow returns to the step Si, so as to repeat the processes S1 to S5.

By performing the above described processes of the steps S1 to the steps S5 in the navigation apparatus, it is possible to always obtain the accurate road width RW in a real time manner. Then, by monitoring the distances DL and DR to the road edge, when the presently traveling vehicle is too close to the road edge, the warning is executed for the driver. Thus, it is possible to secure the safety during the driving operation by aiding the driving operation for the driver. Further, since the road width data is appropriately written into the road width data memory 13, it is possible to efficiently use the road width data in case that the vehicle travels on the same road later on.

Next, the process shown in FIG. 11 is performed under a condition that a desirable destination is set to the navigation apparatus and a route to the destination is judged. At first, in the same manner as the step S1, the distances DL and DR to the road edge on both sides are obtained, and the road width RW is further calculated (step S11).

Then, traffic lane information as for traffic lanes where the vehicle is presently driving, which is included in the map data is read out from the map data memory 12 (step S12). The traffic lane information indicates how many traffic lanes are there on the road where the vehicle is presently traveling. Thus, it is judged whether or not the road where the vehicle is presently traveling is a road having a plurality of traffic lanes on the basis of the traffic lane information (step S13).

If the judgment result in the step S13 is "YES", it is judged on which traffic lane the vehicle is presently traveling on the basis of the judgment result in the step S11 (step S14). This judgment can be performed on the basis of the ratio of the distances DL and DR to the road edge on both sides of the vehicle, which are obtained by the step S11.

Next, it is judged whether or not the lane judged by the step S14 is the appropriate lane corresponding to the route to the destination (step S15). Namely, in case that the vehicle is traveling on a road having three traffic lanes, if the vehicle is to turn to the right at a forward point, the right lane is generally the appropriate lane, if the vehicle is to turn to the left at the forward point, the left lane is generally the appropriate lane, or if the vehicle is to travel straight as it is at the forward point, any lane may be the appropriate lane depending on the actual occasion. Alternatively, information indicative of the appropriate lane for the left turn or the right turn may be set in advance.

As a result of the judgment in the step S15, if the vehicle is presently traveling on the appropriate lane (step S15: YES), the processes are ended. On the other hand, if the vehicle is not presently traveling on the appropriate lane (step S15: NO), a guidance to change the lane is instructed to the driver (step S16). For example, in case that the vehicle is presently traveling on the left lane before a right turning point, a message to recommend the driver to move the vehicle rightward by two lanes may be voice-outputted from the speaker 17 or may be displayed on the display unit 16.

By performing the processes in the step S11 to the step S16 in the navigation apparatus, it is possible to judge the traffic lane where the vehicle is to travel, on a road having a plurality of traffic lanes in a real time manner. Then, just in case that the vehicle is not traveling on the appropriate traffic lane for the right turn or the left turn, the guidance to change the traffic lane is instructed to the driver. Thus, the guidance is instructed only in case of necessity, and unnecessary guidance is avoided in case that the vehicle is traveling on the appropriate traffic lane. Therefore, it is possible to realize a more convenient and comfortable navigation for the driver.

Incidentally, in the example shown in FIG. 11, the case that the guidance to change the traffic lane is instructed only when the vehicle is not traveling on the appropriate traffic lane, i.e., the case that the guidance to change the traffic lane is not instructed when the vehicle is traveling on the appropriate traffic lane has been explained. However, the invention is not limited to this. It is possible to make guidance in some kind when the vehicle is traveling on the appropriate traffic lane. For example, a guidance of "Please keep your lane as it is" may be voice-outputted. By this, it is possible to give a sense of safety to the driver by allowing the driver to recognize that the vehicle is traveling on the appropriate traffic lane.

In the above described embodiment, the image taken by the CCD cameras 19a and 19b may be displayed on the display unit 16. Since the CCD cameras 19a and 19b are installed to take the image in the side direction from the forward portion of the vehicle, it is possible for the driver to watch the side image on the display unit 16 before the driver reaches a position where the driver can actually watch it. Especially, in case that the vehicle enters an intersection from a narrow road, it is possible to watch the side image on the display unit 16 by positioning the tip portion of the vehicle just slightly in the intersection, which is quite helpful for the safe driving operation.

Further, in the embodiment, the case has been explained in which the CCD cameras 19a and 19b are installed to take the image in the side direction of the vehicle. However, the present invention is not limited to this. It is possible to install the CCD cameras 19a and 19b to take the image in the oblique direction, which is between the side direction and the forward direction. By this, it is possible to process the side image in advance on the time axis, so that it is possible to timely obtain the distance to the road edge.

Alternatively, the CCD cameras 19a and 19b may be installed to take the image in the oblique direction, which is between the side direction and the downward direction. If the CCD cameras 19a and 19b, whose angular field of view is rather small, are employed, there may arise a case that the road edge is not in the taken-image when the vehicle is too close to the road edge. In such a case, if the image-taking direction is downward, the road edge can be still in the taken-image, so that it is possible to obtain the distance to the road edge.

Furthermore, the CCD cameras 19a and 19b, whose angular field of view is relatively large, may be employed. For example, by employing the CCD cameras 19a and 19b, whose angular field of view is as large as 180 degrees in the horizontal direction, and by applying the above described processes onto the left area and the right area separately in the taken-image, the distance to the road edge may be obtained. By this, it is possible to obtain the distance to the road edge even more finely.

As described above in detail, according to the image processing apparatus and method of the present invention, since the image on the side of the presently traveling vehicle is taken by the image taking device and the distance to the road edge is obtained by the image process, it is possible to improve the safety and the convenience of the vehicle e.g., securing the safe of the vehicle and obtaining the road width.

Further, according to the navigation apparatus of the present invention, it is possible to improve the function of the navigation apparatus by warning to the driver that the vehicle is close to the road edge, warning the change of the traffic lane based on the judgment for the traffic lane, storing the road width data and so on.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.11-211272 filed on Jul. 26, 1999 including the specification, claims, drawings and summary is incorporated herein by reference in its entirety.

What is claimed is:

1. An image processing apparatus comprising:
   an image taking device for taking an image on a side of a movable body and outputting an image signal corresponding to the taken image;
   a movement vector detecting device for detecting a movement vector for each area of the image taken by said image taking device, on the basis of the image signal while said movable body is moving; and
   a distance calculating device for judging a spatial changing rate of a magnitude of the detected movement vector and calculating the distance to a road edge on the basis of the spatial changing rate.

2. An image processing apparatus according to claim 1, wherein said image taking device comprises a first image taking device for taking the image on a left side of said movable body and a second image taking device for taking the image on a right side of said movable body, and said distance calculating device calculates a first distance to the road edge on the left side and a second distance to the road edge on the right side.

3. An image processing apparatus according to claim 2, further comprising a road width calculating device for calculating a road width of the road, on which said movable body is moving, on the basis of the first distance and the second distance calculated by said distance calculating device.

4. An image processing apparatus according to claim 1, wherein the image signal comprises frame image data, which has a predetermined frame cycle, as a unit, and said movement vector detecting device detects the movement vector on the basis of two consecutive frame image data.

5. An image processing apparatus according to claim 1, wherein said image taking device is installed on a front portion of said movable body.

6. An image processing apparatus according to claim 1, wherein said image taking device takes the image in an oblique forward direction of said movable body.

7. An image processing apparatus according to claim 1, wherein said image taking device takes the image in an oblique downward direction of said movable body.

8. An image processing method of performing an image process on the basis of an image signal, which is outputted from an image taking device for taking an image on a side of a movable body and outputting the image signal corresponding to the taken image, said image processing method comprising:

a movement vector detecting process of detecting a movement vector for each area of the image taken by said image taking device, on the basis of the image signal while said movable body is moving; and a distance calculating process of judging a spatial changing rate of a magnitude of the detected movement vector and calculating the distance to a road edge on the basis of the spatial changing rate.

9. An image processing method according to claim 8, wherein said image taking device comprises a first image taking device for taking the image on a left side of said movable body and a second image taking device for taking the image on a right side of said movable body, and said distance calculating process calculates a first distance to the road edge on the left side and a second distance to the road edge on the right side.

10. An image processing method according to claim 9, further comprising a road width calculating process of calculating a road width of the road, on which said movable body is moving, on the basis of the first distance and the second distance calculated by said distance calculating process.

11. An image processing method according to claim 8, wherein the image signal comprises frame image data, which has a predetermined frame cycle, as a unit, and said movement vector detecting process detects the movement vector on the basis of two consecutive frame image data.

12. A navigation apparatus for performing a route guidance from a present position of a vehicle to a destination on the basis of map data, comprising:

a sensor device including a vehicle speed sensor for detecting a moving speed of said vehicle;

an image taking device for taking an image on a side of said vehicle and outputting an image signal corresponding to the taken image;

a movement vector detecting device for detecting a movement vector for each area of the image taken by said image taking device, on the basis of the image signal while said vehicle is moving; and a distance calculating device for judging a spatial changing rate of a magnitude of the detected movement vector and calculating the distance to a road edge on the basis of the spatial changing rate.

13. A navigation apparatus according to claim 12, further comprising a warning device for warning that said vehicle is close to the road edge if the calculated distance to the road edge is smaller than a threshold value, which is set in advance.

14. A navigation apparatus according to claim 12, further comprising a road width calculating device for calculating a road width of the road, on which said vehicle is moving, on the basis of the calculated distance to the road edge.

15. A navigation apparatus according to claim 14, further comprising a road width data memory for storing road width data corresponding to the calculated road width in correlation with the map data such that the road width data can be updated.

16. A navigation apparatus according to claim 14, further comprising:

a traffic lane judging device for judging a traffic lane, on which said vehicle is presently moving, on the basis of calculation results of said distance calculating device and said road width calculating device; and a warning device for warning an appropriate traffic lane, on which said vehicle is to move, by correlating the judged traffic lane with a route to the destination.

17. A navigation apparatus according to claim 16, wherein said warning device warns the appropriate traffic lane if the judged traffic lane is not coincident with the appropriate traffic lane.

18. A navigation apparatus according to claim 16, wherein said warning device warns that the judged traffic lane is coincident with the appropriate traffic lane if the judged traffic lane is coincident with the appropriate traffic lane.

19. A program storage device readable by a computer, tangibly embodying a program of instructions executable by the computer to perform an image process on the basis of an image signal, which is outputted from an image taking device for taking an image on a side of a movable body and outputting the image signal corresponding to the taken image, said image process comprising:

a movement vector detecting process of detecting a movement vector for each area of the image taken by said image taking device, on the basis of the image signal while said movable body is moving; and a distance calculating process of judging a spatial changing rate of a magnitude of the detected movement vector and calculating the distance to a road edge on the basis of the spatial changing rate.

20. A computer data signal embodied in a carrier wave and representing a series of instructions which cause a computer to perform an image process on the basis of an image signal, which is outputted from an image taking device for taking an image on a side of a movable body and outputting the image signal corresponding to the taken image, said image process comprising:

a movement vector detecting process of detecting a movement vector for each area of the image taken by said image taking device, on the basis of the image signal while said movable body is moving; and a distance calculating process of judging a spatial changing rate of a magnitude of the detected movement vector and calculating the distance to a road edge on the basis of the spatial changing rate.

* * * * *